United States Patent
Nam

Patent Number: 5,943,626
Date of Patent: Aug. 24, 1999

[54] RESERVED COMMUNICATION TECHNIQUE IN MOBILE TELEPHONE

[75] Inventor: Gi-O Nam, Gumi, Rep. of Korea

[73] Assignee: SamSung Electronics Co., Ltd., Kyungki-do, Japan

[21] Appl. No.: 08/728,694

[22] Filed: Oct. 10, 1996

[30] Foreign Application Priority Data

Oct. 11, 1995 [KR] Rep. of Korea .................. 95-34855

[51] Int. Cl.⁶ .......................... H04M 1/274; H04Q 7/38
[52] U.S. Cl. ............................................................. 455/564
[58] Field of Search ................................. 455/415, 458, 455/459, 460, 564; 379/88.2, 210, 214

[56] References Cited

U.S. PATENT DOCUMENTS

| | | | |
|---|---|---|---|
| 4,607,143 | 8/1986 | Prelaz et al. | 379/355 |
| 4,646,160 | 2/1987 | Iizuka et al. | 358/402 |
| 4,887,294 | 12/1989 | Ruey-Guang | 379/355 |
| 4,910,766 | 3/1990 | Ogino et al. | 379/201 |
| 4,939,768 | 7/1990 | Inaba et al. | 455/564 |
| 4,969,185 | 11/1990 | Dorst et al. | 379/209 |
| 5,185,782 | 2/1993 | Srinivasan | 379/88.25 |
| 5,224,146 | 6/1993 | Tanaka et al. | 455/564 |
| 5,369,695 | 11/1994 | Chakravarti et al. | 379/211 |
| 5,384,825 | 1/1995 | Dillard et al. | 455/564 |
| 5,479,500 | 12/1995 | Matsuzaki et al. | 379/355 |
| 5,481,595 | 1/1996 | Ohashi et al. | 455/564 |
| 5,528,681 | 6/1996 | Iwai et al. | 379/355 |

FOREIGN PATENT DOCUMENTS

| | | |
|---|---|---|
| 0308204 A2 | 3/1989 | European Pat. Off. . |
| 60-214126 | 10/1985 | Japan . |
| 6-260991 | 9/1994 | Japan . |

*Primary Examiner*—Willis R. Wolfe
*Attorney, Agent, or Firm*—Robert E. Bushnell, Esq.

[57] ABSTRACT

A reserved communication technique in a mobile telephone includes: inputting a reserved time and telephone number and storing them in a predetermined reservation information storage area after a communication reservation storage key has been operated, and informing the user of the mobile telephone and calling the reserved telephone number if the reservation information is registered by detecting the reservation information area for each predetermined time interval and detecting that the stored reserved time has been reached. After setting the communication reservation function in a mobile telephone, when the reserved communication time is reached, the reserved telephone number is automatically dialed to perform a communication service, thereby preventing the promise of a communication from being broken due to a lapse of memory.

11 Claims, 3 Drawing Sheets

RESERVED COMMUNICATION TECHNIQUE IN MOBILE TELEPHONE

CLAIM OF PRIORITY

This application makes reference to, incorporates the same herein, and claims all benefits accruing under 35 U.S.C. §119 from an application for RESERVED COMMUNICATIONMETHOD IN MOBILE TELEPHONE earlier filed in the Korean Industrial Property Office on Oct. 11, 1995 and there duly assigned Serial No. 34855/1995.

BACKGROUND OF THE INVENTION

1. Field of the Invention

The present invention relates to a reserved communication technique in a mobile telephone, and more particularly, to a reserved communication technique for performing communication by reserving a telephone number to be called and a communication time and for automatically calling the reserved telephone number when the reserved communication time has been reached.

2. Description of the Related Art

In general, an exchange system has a reserved communication function. The reserved communication function will now be described briefly. When a subscriber (hereinafter, referred to as a "calling subscriber") among plural subscribers connected to a exchange system calls a desired counterpart subscriber (hereinafter, referred to as a "called subscriber"), if the called subscriber is communicating with another subscriber, the exchange system supplies the calling subscriber with a busy tone. In such a state, if the calling subscriber wants to communicate with the called subscriber as soon as the present communication is terminated, then the communication is reserved by the exchange system. Then, when the called subscriber terminates the communication and hangs up the telephone, the switch system detects the termination and on-hook state and transmits a ring signal to both the calling subscriber and the called subscriber, thereby effecting the communication.

Since a mobile telephone does not have such a reserved communication function, if a user intends to call a desired place at a desired time, the user must check the time. When subscribers promise to communicate with each other at a specific time however, the promise to call may be forgotten for some reason or other.

Dillard et al., U.S. Pat. No. 5,384,825, entitled Method For Memory Dialing For Cellular Telephones, is but one example of a contemporary arrangement endeavoring to use a memory dialing for cellular telephones. While Dillard et al. '825 clearly teaches the dialing of previously stored telephone numbers, I have found that contemporary art such as Dillard '825 does not teach or suggest the automatic dialing of these numbers at previously stored times.

On the other hand, Srinivasan U.S. Pat. No. 5,185,782 entitled ACD Arrangement For Automatically Returning A Call At A Time Specified By The Original Caller discloses an arrangement for automatically returning a call at a time specified by the original caller. While this system automatically returns a call at a predetermined time, I have found that it does not teach or suggest an arrangement for a mobile telephone in which the user of the mobile telephone stores both a telephone number and a predetermined time for automatically calling the stored telephone number.

SUMMARY OF THE INVENTION

Therefore, it is an object of the present invention to provide an improved telecommunications techniques.

It is also an object to provide a programmed communication technique in a mobile telephone for performing communication by reserving a desired telephone number and a communication time and for calling the reserved telephone number automatically when the reserved communication time has been reached.

To achieve these and other objects, the present invention provides a reserved communication technique in a mobile telephone by: inputting a reserved time and telephone number and storing them in a predetermined reservation information area, after a communication reservation storing key has been operated; and calling both the subscriber corresponding to the mobile telephone and the reserved telephone number if the reservation information has been stored by checking the reservation information area for each predetermined time interval and by detecting that the reserved time has been reached.

BRIEF DESCRIPTION OF THE DRAWINGS

A more complete appreciation of this invention, and many of the attendant advantages thereof, will be readily apparent as the same becomes better understood by reference to the following detail description when considered in conjunction with the accompanying drawings, in which like reference symbols indicate the same or similar elements components, wherein.

DETAILED DESCRIPTION OF THE PREFERRED EMBODIMENT

Figure 1:
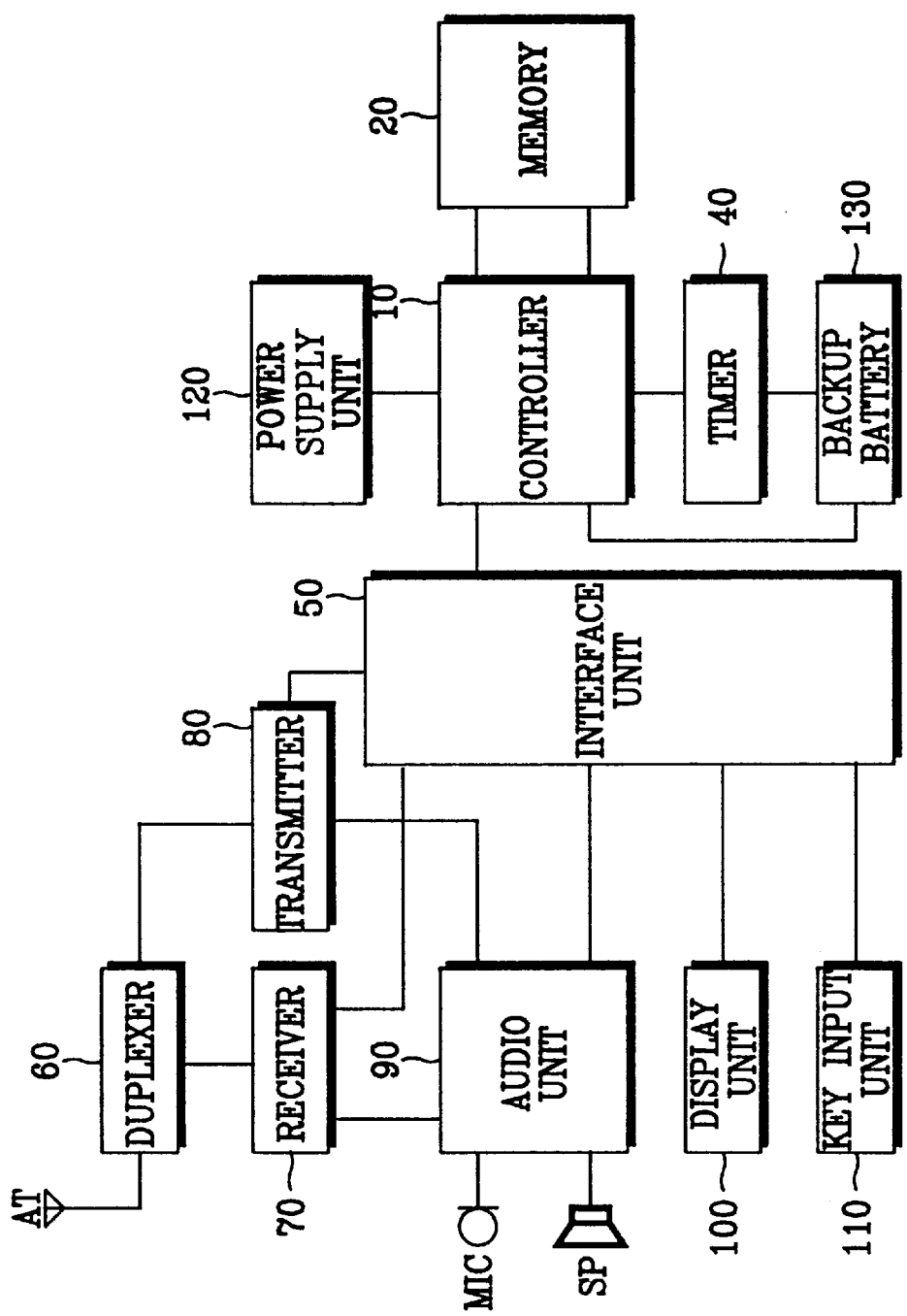
FIG. 1 is a block diagram of a mobile telephone according to the present invention.

As shown in FIG. 1, controller 10 controls the overall operation of a mobile telephone to effect a reserved communication by calling a reserved telephone number when a reserved time has been reached after checking the reserved time. An interface unit 50 interfaces input and output data between the controller 10 and various other components. A memory 20 stores a predetermined program for controlling the overall operation of the mobile telephone and stores various kinds of input and output data processed during execution of the program. A timer 40 counts time under the control of the controller 10. A duplexer 60 performs communication with a base station (not shown) via an antenna AT so that a signal from a transmitter 80 is transmitted to the base station via the antenna AT and a signal transmitted from the base station via the antenna AT is received in a receiver 70. The receiver 70 is controlled by the controller 10 through the interface unit 50 and receives a radio frequency signal output from the duplexer 60. The transmitter 80 transmits the radio frequency signal modulated by an audio unit 90 to the duplexer 60. The audio unit 90 is controlled by the controller 10 through the interface unit 50, and uses an audio signal input through a microphone (MIC) to form the modulated radio frequency signal and demodulates the radio frequency signal received from the receiver 70 into an audio signal which is transmitted to a speaker (SP) When a ring signal is generated by the base station, the audio unit 90 detects the ring signal from the receiver 70 and then transmits it through a ringer (not shown). Accordingly, the user verifies aurally that the ring signal has been generated by the base station. When the user presses a predetermined key, a key input unit 110 generates a corresponding key input signal and outputs it to the interface unit 50. A display unit 100 is controlled by the controller 10 through the interface unit 50, and receives the key input signal generated by the key input unit 110 and various information signals from the controller 10 and displays them. The display unit 100 includes a liquid crystal display (LCD) for displaying various kinds of information, and a light emitting diode (LED) which allows the user to verify the displayed information. A power supply unit 120 supplies power to various elements under the control of the controller 10. A backup battery 130 supplies power to the controller 10 and timer 40 when the power is off.

Figure 2:
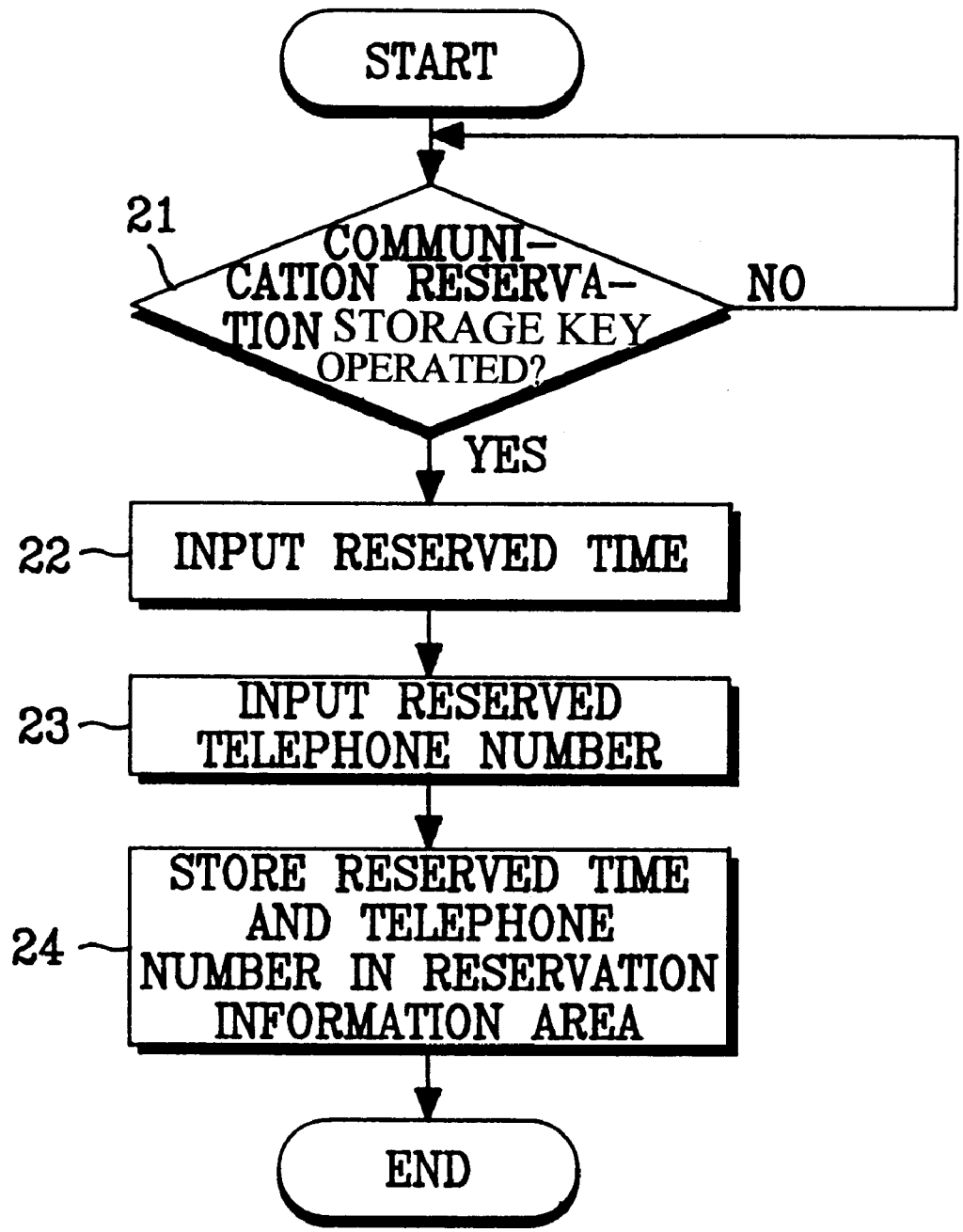
FIG. 2 is a flowchart showing a reserved communication storage control process according to the present invention.
Figure 3:
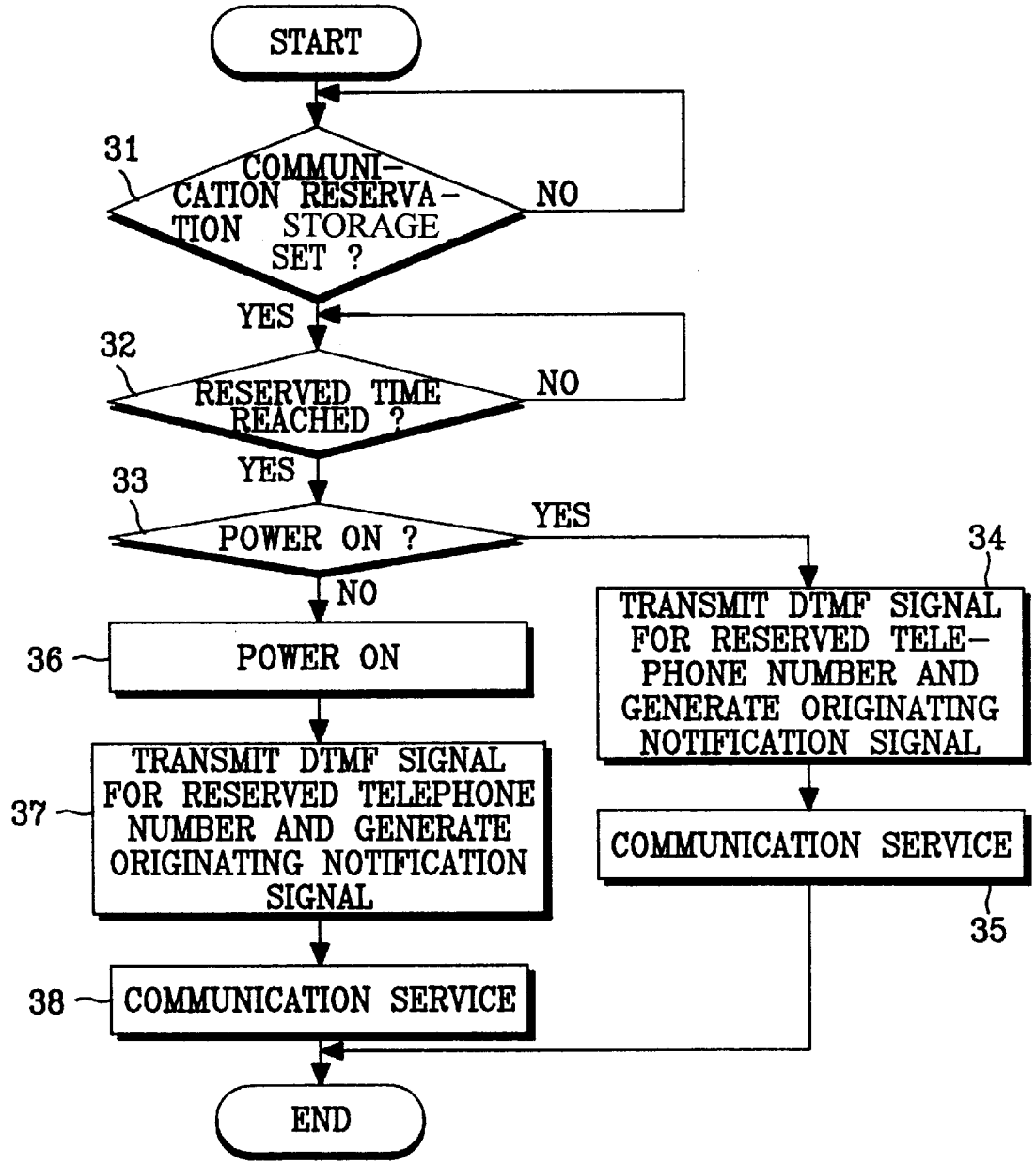
FIG. 3 is a flowchart showing a reserved telephone calling process according to the principles of the present invention.

Hereinbelow, a preferred embodiment of the present invention will be described in more detail with reference to FIGS. 1 through 3.

First, the operation of storing the communication reservation will be described. If a communication is to be reserved, the user presses a communication reservation storage key of the key input unit 110. In a step 21, the controller 10 checks whether the communication reservation storage key has been operated. If the communication reservation storage key has been operated input, the reserved time and telephone number input by the user in steps 22 and 23 are stored in the reservation information area of the memory 20 by the controller 10 in step 24. Accordingly, a communication reservation has been made.

After the communication reservation has been made, the controller 10 checks the reservation information area of the memory 20 for each predetermined time interval in step 31 to determine whether or not a communication reservation storage function has been set. When it has been determined that the communication reservation storage function has been set, the controller 10 checks the timer 40 in a step 32 to determine whether the reserved time has been reached. If the reserved time has been reached, the process proceeds to step 33. If the reserved time has not been reached, the controller waits until the reserved time has been reached. In step 33, the controller 10 checks to determine if the power has been turned on. If the power has been turned on, the process proceeds to step 34. In step 34, the controller 10 reads the reserved telephone number stored in the memory 20, transmits a dual tone multi-frequency (DTMF) signal for the reserved telephone number and generates an originating notification signal for notifying the user that the DTMF signal has been transmitted. The originating notification signal is transmitted via the speaker SP, or the ring signal may be generated via the ringer. Thereafter, in step 35, a conventional communication service is effected. However, in step 33, if it has been determined that the power has not been turned on, the process proceeds to step 35 to turn the power on.

Thereafter, in step 37, the controller 10 reads the reserved telephone number stored in the memory 20, transmits the DTMF signal for the reserved telephone number and generates the originating notification signal for notifying the user of the transmission of the DTMF signal. The originating notification signal is transmitted via the speaker SP, or the ring signal may be generated via the ringer. Then, in step 38, a conventional communication service is effected.

As described above, according to the present invention, after setting the communication reservation function in a mobile telephone, when the reserved communication time has been reached, the reserved telephone number is automatically dialed to perform a communication service, thereby preventing the promise of a telephone communication from being broken due to a lapse of memory.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A reserved communication method in a mobile telephone, comprising the steps of:

receiving both a reserved time and telephone number input by a user and storing said reserved time and said telephone number in a predetermined reservation information storage area after a communication reservation storage key has been operated by the user; and upon the reserved time having been reached, supplying power to the mobile telephone if power is not already being supplied thereto, placing a telephone call to the stored reserved telephone number, and informing the user of said mobile telephone of said call.

2. A reserved communication method as claimed in claim 1, a ring signal being transmitted to a subscriber corresponding to said reserved telephone number and an originating notification signal being generated in the mobile telephone to inform the user thereof.

3. A reserved communication method as claimed in claim 2, further comprising the step of:

establishing a communication service conducting electromagnetic information between the user and the subscriber via said mobile telephone after the ring signal and the originating notification signal have been transmitted.

4. A reserved communication method in a mobile telephone comprising the steps of:

receiving a signal input in response to an operation of a communication reservation storage key by a user;

storing both reserved time and telephone number input by the user in a predetermined reservation information storage area to set a reserved communication function; and upon the reserved time having been reached, supplying power to the mobile telephone if power is not already being supplied thereto, calling the reserved telephone number and informing the user of the mobile telephone of the call.

5. A reserved communication method as claimed in claim 4, a ring signal being transmitted to a subscriber corresponding to said reserved telephone number and an originating notification signal being generated in the mobile telephone to inform the user thereof.

6. A reserved communication method as claimed in claim 5, further comprising the step of:

establishing a communication service conducting electromagnetic information between the user and the subscriber via said mobile telephone after the ring signal and the originating notification signal have been transmitted.

7. A reserved communication method in a mobile telephone comprising the steps of:

receiving both a reserved time and telephone number inputted by a user and storing said reserved time and said telephone number in a predetermined reservation information storage area after a communication reservation storage key has been operated by the user;

checking the reservation information storage area for each predetermined time interval to detect whether reservation information has been stored;

detecting whether a current time has reached the stored reserved time if it has been determined that reservation information has been stored; and supplying power to the mobile telephone if power is not already being supplied thereto, upon the reserved time having been reached, calling the reserved telephone number, and informing the user of the mobile telephone of the call.

8. A reserved communication method as claimed in claim 7, further comprising the step of:

establishing a communication service conducting electromagnetic information between the user and the subscriber via said mobile telephone after the ring signal and the originating notification signal have been transmitted.

9. A mobile telephone having a reserved communication capability comprising:

a memory storing information;

input means for receiving both a reserved time and telephone number from a user and for storing them in a predetermined reservation information storage area of said memory after a communication reservation storage key included in said input means has been operated by the user;

timing means for determining a present time;

controller and interface means for interfacing said memory and input means and timing means and controlling the application of power to the mobile telephone; and informing means controlled by said controller for informing the user of the mobile telephone when said controller has called the stored reserved telephone number and applied power to the mobile telephone if power was not already supplied thereto when said timing means has determined that the present time corresponds to the stored reserved time.

10. A mobile telephone as claimed in claim 9, said informing means generating an originating notification signal in the mobile telephone.

11. A mobile telephone as claimed in claim 10, said controller controlling the mobile telephone to effect a communication service after the stored reserved telephone number has been called and the originating notification signal generated.

* * * * *